(12) United States Patent
Dohrmann et al.

(10) Patent No.: US 12,441,559 B2
(45) Date of Patent: Oct. 14, 2025

(54) FEEDING DEVICE FOR GUIDING AND PROVIDING ONE-PIECE TIES

(71) Applicant: HELLERMANNTYTON GmbH, Tornesch (DE)

(72) Inventors: Oliver Dohrmann, Uetersen (DE); Carsten Scheel, Uetersen (DE)

(73) Assignee: HellermannTyton GmbH, Tornesch (DE)

( * ) Notice: Subject to any disclaimer, the term of this patent is extended or adjusted under 35 U.S.C. 154(b) by 119 days.

(21) Appl. No.: 18/528,430

(22) Filed: Dec. 4, 2023

(65) Prior Publication Data

US 2024/0190668 A1   Jun. 13, 2024

(30) Foreign Application Priority Data

Dec. 8, 2022   (DE) .......................... 202022106860.7

(51) Int. Cl.
*B65G 51/08* (2006.01)
*B65G 17/32* (2006.01)
*B65G 51/18* (2006.01)
*B65G 51/42* (2006.01)

(52) U.S. Cl.
CPC ........... *B65G 51/08* (2013.01); *B65G 17/323* (2013.01); *B65G 51/18* (2013.01); *B65G 51/42* (2013.01); *B65G 2203/042* (2013.01)

(58) Field of Classification Search
None
See application file for complete search history.

(56) References Cited

U.S. PATENT DOCUMENTS

| 5,417,253 | A | 5/1995 | Kurmis |
| 6,019,143 | A | 2/2000 | Marik et al. |
| 6,513,555 | B1 | 2/2003 | Lesser et al. |
| 8,157,485 | B2 * | 4/2012 | Dear ..................... B65G 51/04 |
| | | | 406/191 |
| 2008/0193230 | A1 | 8/2008 | Dear |

FOREIGN PATENT DOCUMENTS

| CN | 108945564 B | 12/2018 |
| CN | 110890712 A | 3/2020 |
| DE | 3382610 | 4/1993 |
| DE | 69805009 | 12/2002 |
| EP | 3628603 A1 | 4/2020 |

(Continued)

OTHER PUBLICATIONS

JPH07215318A, Machine Translation, Retrieved from ESPACENET (Jun. 14, 2025) (Year: 1995).*

(Continued)

*Primary Examiner* — William R Harp
(74) *Attorney, Agent, or Firm* — Colby Nipper PLLC

(57) ABSTRACT

The disclosure relates to a feeding device for guiding and providing one-piece ties, with a hose unit and a funnel unit. The hose unit is designed to guide a respective one-piece tie in a hose inner via an air flow along the hose unit towards an outlet end of the hose unit and subsequently in an outlet direction out of the outlet end of the hose unit to the funnel unit. The funnel unit is arranged at the outlet end of the hose unit on the hose unit and is designed to receive the respective one-piece tie guided through the hose unit.

20 Claims, 4 Drawing Sheets

(56) References Cited

FOREIGN PATENT DOCUMENTS

| | | | |
|---|---|---|---|
| JP | H05270519 | A | 10/1993 |
| JP | H07215318 | A | 8/1995 |
| JP | 2001504785 | A | 4/2001 |
| JP | 3949177 | B | 7/2007 |
| JP | 2022166842 | A | 11/2022 |

OTHER PUBLICATIONS

"Extended European Search Report", EP Application No. 23213849.5, Jun. 4, 2024, 8 pages.
"Foreign Office Action", JP Application No. 2023-206880, Oct. 28, 2024, 6 pages.
"Search Report", DE Application No. 202022106860.7—Translation not available, Nov. 15, 2023, 5 pages.
"Foreign Office Action", JP Application No. 2023-206880, Apr. 30, 2025, 6 pages.
"Foreign Office Action", JP Application No. 2023-206880, Aug. 5, 2025, 7 pages.

\* cited by examiner

FEEDING DEVICE FOR GUIDING AND PROVIDING ONE-PIECE TIES

INCORPORATION BY REFERENCE

This application claims priority to German Patent Application No. DE202022106860.7, filed Dec. 8, 2022, the disclosure of which is incorporated by reference in its entirety.

BACKGROUND

It is a known process to feed, as a special variant of the more generally defined one-piece ties, cable ties via a hose from a cable tie reservoir to a tool installing the cable ties. The respective (loose) cable tie is thereby shot through the hose with its cable tie band ahead by means of (via) air pressure, e.g., by means of an air flow, and then received up by a funnel, from where it is transferred, for example, to an automatic bundling tool. In order to achieve efficient transport through the hose, a cross-sectional shape of the hose inner is generally adapted to a cross-sectional shape at the thickest point of the cable tie. With the known systems, corresponding automatic tools such as automatic bundling tools or robots, which install cable ties, can be connected to the cable tie reservoir in spatially flexible variable positions and orientations. However, the existing approaches are limited to conventional cable ties with a cable tie band and a simple cable tie head, which has an essentially cuboid shape.

SUMMARY

The technical problem to be solved by aspects of the disclosed feeding device can thus be seen in enabling automatic bundling tools and/or robotic devices provided with a bundling tool to be used in flexibly changeable positions and orientations which are not limited to the use of the conventional cable ties. In particular, the task may involve providing one-piece ties as cable ties extended by a functional head, in particular loose one-piece ties, to an automatic bundling tool and/or a robotic device provided with a bundling tool.

One aspect relates to a feeding device for guiding and providing one-piece ties. The one-piece ties can be individually guided and/or provided, for example to an automatic bundling tool for bundling a bundle good by means of the respective one-piece tie, in particular to a slider unit of the automatic bundling tool. Here, the one-piece tie stands for a generalized concept of the conventional cable tie. Like an ordinary cable tie, a one-piece tie has a band at one end of which a band tip is arranged and at the other end of which a head (part) is arranged. Corresponding to an ordinary cable tie, when the one-piece tie is used as intended, the tip of the band is guided around a bundle material through a window in the head and locked in the head in order to bundle the bundle good. Thereby, the one-piece tie has a head with additional functionality, which may be referred to accordingly as a functional head. The additional functionality comprises, in particular, a fastening functionality for fastening the functional head and thus the one-piece tie (and thus indirectly also the bundled good) to an object other than the bundled good to be bundled. For example, the functional head can be designed as a mushroom head for anchoring the one-piece tie in a through hole of a metal sheet. However, this is only an example possibility for a multitude of functions to which the functional head can be adapted.

The feeding device has a hose unit which is designed to guide, by means of an air flow, a respective one-piece tie with a band tip of the one-piece tie and thus with the band in front in a hose inner along the hose unit towards an outlet end of the hose unit and then in an outlet direction out of the outlet end of the hose unit to a funnel unit. As is known in the prior art for conventional cable ties, air pressure is thus used to shoot each one-piece tie through the hose unit and thus to be able to flexibly guide the one-piece ties to a tool that installs them. Accordingly, the funnel unit is arranged at the outlet end of the hose unit, which is designed to receive the respective one-piece tie that is guided and provided through the hose unit. For this purpose, the funnel unit can have a corresponding funnel element, for example with funnel surfaces converging in the outlet direction, which guide the band tip and thus the band of the one-piece tie into a predetermined position.

The hose unit has a constructively and thus well-defined predetermined bend in an end region surrounding the outlet end. The bend is thus provided with well-defined predefined properties such as (bend) angle and/or (bend) radius and/or (bend) length due to the design of the feeding device. In this way, the constructively predetermined bend differs from random bends of the hose unit, as is typically to be expected in daily use when flexibly changing the position and/or orientation of a bundle tool fed with one-piece ties via the hose unit. Accordingly, the constructively predetermined bend may be invariant or substantially invariant, e.g., invariant within predetermined limits. The constructively predetermined bend can thus be predetermined with correspondingly fixed values for the aforementioned properties of, for example, angle and/or radius and/or length, or with corresponding ranges of values for angle and/or radius and/or length, which can be predetermined, for example, by an elasticity of the hose unit in the end region that is predetermined for the hose unit, or also by a suitable support structure.

The funnel unit comprises the funnel element, which is arranged rotatably about an axis of rotation extending along (and thus substantially parallel or parallel to) the outlet direction by means of a drive element of the funnel unit relative to the outlet end of the hose unit. At an end region of the funnel element remote from the outlet end of the hose unit in the outlet direction, the funnel element has a slit which is designed to receive the band of the respective one-piece tie in one of (in particular exactly) two (or essentially two) orientations. The two orientations are achieved by the fact that, when the tie is accommodated in the slit, the respective one-piece tie can no longer be turned around the main extension axis of the cable tie, which corresponds to a longitudinal direction of the tie, without rotating the funnel element. The two orientations are thereby predetermined except for a predetermined deviation, which is determined by a clearance of the band in the slit. For example, in the first of the two orientations, the band is arranged with a smooth back side of the band to one side of the slit and a front side of the band provided with a detent structure to the other side of the slit, and in the second of the two orientations, the reverse is true. If the slit is too thick, the band passing through the slit can be tilted about its longitudinal axis. The slit can be correspondingly adapted to a band thickness of the one-piece ties which the feeding device is configured and/or specified for in order to achieve a well-defined and sufficiently accurate orientation of the band and thus of the one-piece tie for the respective application. The slit can be defined by the converging funnel surfaces of the funnel element, which may also be referred to as funnel walls, in the outlet direction.

In this way, irrespective of a length of the hose unit or a respective course of the hose unit, e.g., irrespective of a position and/or orientation of the tool to be equipped with one-piece ties, the respective one-piece tie is always received in the funnel element exactly in one of two predetermined orientations, whereby these two orientations can be automatically converted into a single orientation by rotating the funnel element about the axis of rotation. In this way, one-piece ties of the respective type of one-piece tie for which the feeding device is specified can be provided automatically and with a high degree of reliability, e.g., in a process-safe manner, to the tool to be provided with the one-piece tie, thus increasing flexibility of the tool to be with the one-piece tie. Depending on the shape of the functional head of the one-piece tie, the feeding device can thereby also be suitable for several different types of one-piece ties which, for example, all have the same cross-section at a thickest point of the cable tie, e.g., of the functional head, in particular a round cross-section with the same or essentially the same diameter. A thickness of the respective band is thereby also ideally the same for the different types and thus adapted to the slit, so that twisting of the one-piece tie in the slit is prevented. The described solution makes use of the fact that bands of cable ties and also more generally bands of one-piece ties have a rectangular cross-section, with the sides of the band that are longer in cross-section being assigned to a width of the band and the sides of the band that are shorter in cross-section being assigned to a thickness of the band. Accordingly, the band is easier to deform in a thickness direction than transversely in a width direction. As a result, the band and thus the one-piece tie aligns itself according to one of two orientations when passing through the bend inside the hose, namely so that the thickness direction runs in a plane of the bend, in which the predetermined bend runs and which can correspondingly be called the bend plane. For example, the smooth rear side of the band thus points either outwards or inwards in the bend.

The converging funnel surfaces or funnel walls of the funnel element can be designed as form-fit stop surfaces for the one-piece ties. A (three-dimensional) contour of the respective funnel wall is then adapted to a (three-dimensional) shape of the corresponding one-piece tie (functional) head, so that when the head impacts and thus the one-piece tie is braking, the one-piece tie is in two-dimensional contact/support with at least one of the funnel walls. The mechanical contact between the one-piece tie and the funnel wall on impact therefore takes place at a contact surface (in contrast to the contact line or contact point explained below). This minimises the size of a cavity between the respective funnel wall and the one-piece tie.

In contrast to the two-dimensional contact/support, the mechanical contact occurs at individual contact points and/or contact lines when the head impacts/decelerates with a funnel wall that is not adapted to the contour/shape of the one-piece tie head. The point or linear contact on impact has the consequence that, depending on the speed and/or rigidity of the one-piece tie, a deformation of the one-piece tie can occur, which in turn leads to a movement of the one-piece tie against the outlet direction via corresponding restoring forces. As a disadvantageous consequence, the one-piece tie is not positioned in a clearly defined position, which is problematic for subsequent process steps. The one-piece tie can therefore be provided in a very precisely defined position by means of the form-fit stop surfaces. In particular, the contours of the (opposing) funnel walls can be identical, for example symmetrical with regard to the slot and/or the axis of rotation. This is advantageous because functional heads are often not symmetrical, and so regardless of the orientation of the one-piece tie in the funnel element (always at least on one funnel wall), a two-dimensional contact is achieved on impact, which experience has shown to already ensuring sufficiently reduced deformation of the one-piece tie on impact.

In a further embodiment, it is thereby provided that the slit is oriented transversely to the bending plane (e.g., substantially perpendicularly, perpendicularly, or up to a predetermined deviation (for example of at most 1°, at most 3° or 5°), perpendicularly to the bending plane). In this way, the one-piece tie can be received particularly reliably by the funnel element, since a flexibility of the band in the thickness direction is substantially greater than in the width direction of the band, since the width is greater than the thickness.

In a further embodiment, a gripper unit is provided, which is designed to grip and provide the respective one-piece tie, the band of which is received by the slit. In particular, the one-piece tie can be provided to an automatic bundling tool by means of the gripper unit of the feeding device, for example to a slide unit of the automatic bundling tool for bundling the bundle good by means of the respective one-piece tie. In this way, the gripper unit and the funnel unit, and thus the one-piece tie, can be particularly well adapted to one another with regard to the orientations of the one-piece tie when used as intended, and the respective one-piece ties can thus be provided particularly reliably and precisely to the tool to be loaded with the one-piece tie.

In a further embodiment, a sensor unit and a control unit coupled to the sensor unit and the funnel unit are also provided. The sensor unit is designed to detect an orientation of the respective one-piece tie when the band of the one-piece tie is received in the slit. In particular, the detected orientation is one of exactly two possible orientations specified by the slit. The control unit is designed to bring the funnel element and thus the received respective one-piece tie into a predetermined rotational position as a function of, e.g., in dependence upon the orientation of the respective one-piece tie detected by the sensor unit. In particular, the predetermined rotational position can be predetermined for the gripper unit when gripping the one-piece tie. Preferably, the predetermined rotational position is selected such that either the funnel element is rotated by 180 degrees by means of the drive element to reach the predetermined rotational position and thus the predetermined orientation of the one-piece tie, or the funnel element is not rotated, e.g., is left in an unchanged position. If the predetermined orientation to be achieved for the one-piece tie, in which the one-piece tie is to be provided, requires it, the control unit can also be configured to rotate the funnel element either by X degrees or by X+180 degrees after receiving the one-piece tie. The sensor unit may be or include, for example, a photoelectric sensor and/or a camera, which detects at the respective orientation of the one-piece tie picked up by the funnel unit based on a shape of the functional head. In this way, the one-piece tie guided and provided by the feeding device can be automatically brought into the correct, e.g., predetermined, orientation in a particularly simple and reliable manner.

In a further embodiment, it is provided that the slit of the funnel element merges at one or both ends into an opening oriented transversely to the outlet direction on one side or two sides of the funnel element. In this case, the opening can be adapted to a shape, in particular a size, of the functional head of the one-piece tie. In this way, the one-piece tie can be provided to the tool to be loaded in a particularly simple manner, for example without opening or closing the funnel unit. Furthermore, the orientation of the one-piece tie in the slit may be detected more easily.

In yet a further embodiment, it is provided that, viewed in the outlet direction, a multi-part further funnel element is arranged behind the slot of the one funnel element, in which the associated one-piece tie band is at least partially accommodated when the one-piece tie head is accommodated in the one funnel element. The multi-part further funnel element extends, in the outlet direction, in particular over a large part, for example more than 50%, preferably more than 65%, particularly preferably more than 80%, of the length of the one-piece tie band.

The multi-part further funnel element can be transferred from a closed configuration to an open configuration and back, and for this purpose e.g. can have a joint between different funnel element parts. In the closed configuration, the additional funnel element completely surrounds the one-piece tie band radially circumferential. This reduces the probability of the one-piece tie falling out of the one funnel element when the one funnel element rotates around the axis of rotation. In the open configuration, the further funnel element radially circumferential has a gap so that the one-piece tie can be moved laterally out of the further funnel element through the gap in a direction transverse to the axis of rotation.

In a further embodiment, it is provided that the end region with the constructively predetermined bend along the hose unit extends over at most three times, preferably at most twice, a length of the one-piece ties which are fed through the feeding device during intended use. If the feeding device is specified for different types of one-piece ties, for example the shortest length can be selected as a reference. In this way, on the one hand, the flexibility of the tube unit is maintained and, on the other hand, a renewed twisting of the one-piece ties about their longitudinal axis within the tube unit after an alignment is prevented, which leads to a particularly reliable achievement of one of the two orientations of the one-piece tie in the slit.

In a further embodiment, it may be provided that a radius of the constructively predetermined bend (bending radius) is at least 20 mm. This ensures that the hose unit and the one-piece ties are not damaged when the orientation is adjusted, which in turn increases reliability and flexibility.

In a further embodiment, it is provided that an angle of the design bend (bending angle) is at least 45 degrees, preferably at least 60 degrees, particularly preferably at least 80 degrees, and/or at most 135 degrees, preferably at most 120 degrees, particularly preferably at most 100 degrees. An angle of 90 degrees±5 degrees has proven to be ideal in this case. The orientation of the one-piece ties works particularly well in the ranges of values mentioned.

In a further embodiment, it is provided that the hose unit at the bend is at least partially, partly, or entirely, made of a metal. In particular, an inner wall of the hose unit on the inside of the hose at an outer side of the bend can be made entirely or partly of metal. In this way, wear of the hose unit is reduced, which in turn is beneficial to the reliability and accuracy of the orientation of the one-piece tie in the funnel element.

In a further embodiment, it may be provided that the hose inner has a round cross-section and, in particular, that a functional head of the one-piece tie, which is guided through the feeding device during intended use, has a round cross-section at a point of greatest diameter. In particular, the point of greatest diameter may be an intermediate or plate portion of the functional head, which separates a first head portion of the functional head of the one-piece tie, which is closer to the band and has the window, from a second head portion of the functional head, which has a further fastening element. In this way, the reliable orientation of the one-piece tie can be achieved for a plurality of different types of one-piece ties having different functional heads, in particular different second head portions but the same plate portions.

Another aspect relates to an automatic bundling tool and/or a robotic device comprising an automatic bundling tool, comprising a feeding device according to one of the described embodiments coupled to the automatic bundling tool and/or the robotic device by means of a mechanical and/or electrical interface and/or comprising a mechanical and/or electrical interface for coupling to a feeding device according to one of the described embodiments.

Another aspect relates to a method for guiding and providing one-piece ties. A method step is a first guiding of a respective one-piece tie along a hose unit in a hose inner of the hose unit by means of an air flow towards an outlet end of the hose unit. A further process step is a second guiding of the respective one-piece tie through an end region of the hose unit, which has a constructively predetermined bend. A next process step following the first two process steps is a third guiding of the respective one-piece tie in an outlet direction out of the outlet end of the hose unit to a funnel unit. This is followed by a further process step of receiving the respective one-piece tie by the funnel unit, wherein a band of the respective one-piece tie is received by a slit in a funnel element of the funnel unit. There follows the method step of checking an orientation of the respective one-piece tie received by the slit and, depending on a result of the checking, as a further method step rotating the respective one-piece tie received by the slit about an axis of rotation extending along the discharge direction into a (first) position predetermined as desired position, at least if the checking shows that the one-piece tie has a (second) orientation predetermined as undesirable position, e.g., if this is necessary for aligning the respective one-piece tie in the (first) orientation predetermined as desired. Finally, the last step of the process is to provide the respective one-piece tie in the (first) orientation specified as desired position. First and second orientation can be the two orientations introduced above.

The features and combinations of features described above, including the general part of the description, as well as the features and combinations of features disclosed in the figure description or in the figures alone, may be used not only alone or in the combination described, but also with other features or without some of the disclosed features, without departing from the scope of the present disclosure. Consequently, embodiments not explicitly shown and described in the figures, but which may be produced by separately combining the individual features disclosed in the figures, are also part of the present disclosure. Therefore, embodiments and combinations of features that do not comprise all features of an originally formulated independent claim are also to be considered disclosed. Furthermore, embodiments and combinations of features that differ from or go beyond the combinations of features described in the dependencies of the claims are considered disclosed.

BRIEF DESCRIPTION OF THE DRAWINGS

Example embodiments are described in more detail below with reference to schematic drawings.

In the figures, identical or functionally identical elements are provided with the same reference signs.

DETAILED DESCRIPTION

The disclosure relates to a feeding apparatus for guiding and providing (e.g., feeding), one-piece ties, comprising a hose unit adapted to guide a respective one-piece tie in a hose inner by means of an air flow along the hose unit toward an outlet end of the hose unit and subsequently in an outlet direction out of the outlet end of the hose unit to a funnel unit, and comprising the funnel unit being arranged at the outlet end of the hose unit on the hose unit and adapted to receive the respective one-piece tie guided through the hose unit to a funnel unit.

Figure 1:
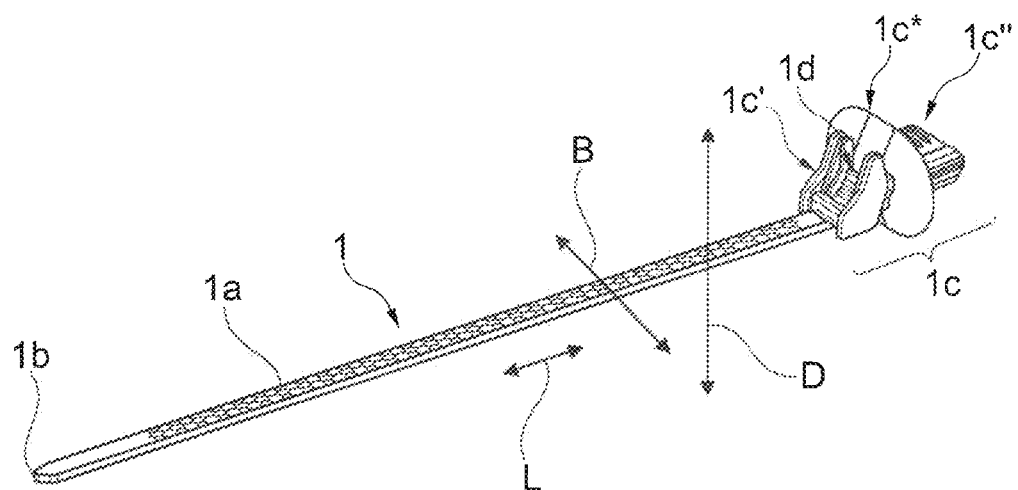
FIG. 1 is an example embodiment of a one-piece tie.

FIG. 1 shows an example embodiment of a one-piece tie. The one-piece tie 1 has a band 1*a*, at one end of which a band tip 1*b* is arranged and at the other end of which a functional head 1*c* is arranged. The cable image band 1*a* defines with its main extension direction a length direction L of the cable tie and with its thickness and width, respectively, a thickness direction D extending perpendicular to the length direction L and a width direction B extending perpendicular to the length direction L and the thickness direction D. Since the thickness is smaller than the width, the band 1*a* is thereby substantially more flexible in the thickness direction D than in the width direction B, a behavior which is also known from ordinary cable ties and is known to cause problems in automated guiding and provisioning, since cable ties and one-piece ties 1, in particular loose cables or one-piece ties 1 such as the embodiment shown here, in practice often have bent ties 1*a*.

A location of the largest diameter of the one-piece tie 1 is formed by a plate section 1*c*\* of the functional head 1*c* in the example shown. There, the one-piece tie 1 has a round cross-section, whereby the cross-section is oriented perpendicular to the longitudinal direction L. The plate section 1*c*\* separates a first head section 1*c*', which faces the band 1*a*, from a second head section 1*c*", which faces away from the band. The first head section 1*c*' has a window 1*d* through which the band 1*a* is guided when the one-piece tie 1 is used as intended, in order to bundle a bundle good. The second head section 1*c*" is designed for fastening the functional head 1*c* and thus the one-piece tie 1 or, in the case of intended use, the corresponding bundle good to a further object that is different from the bundle good and the one-piece tie 1, and can be designed differently depending on the area of application.

Figure 2:
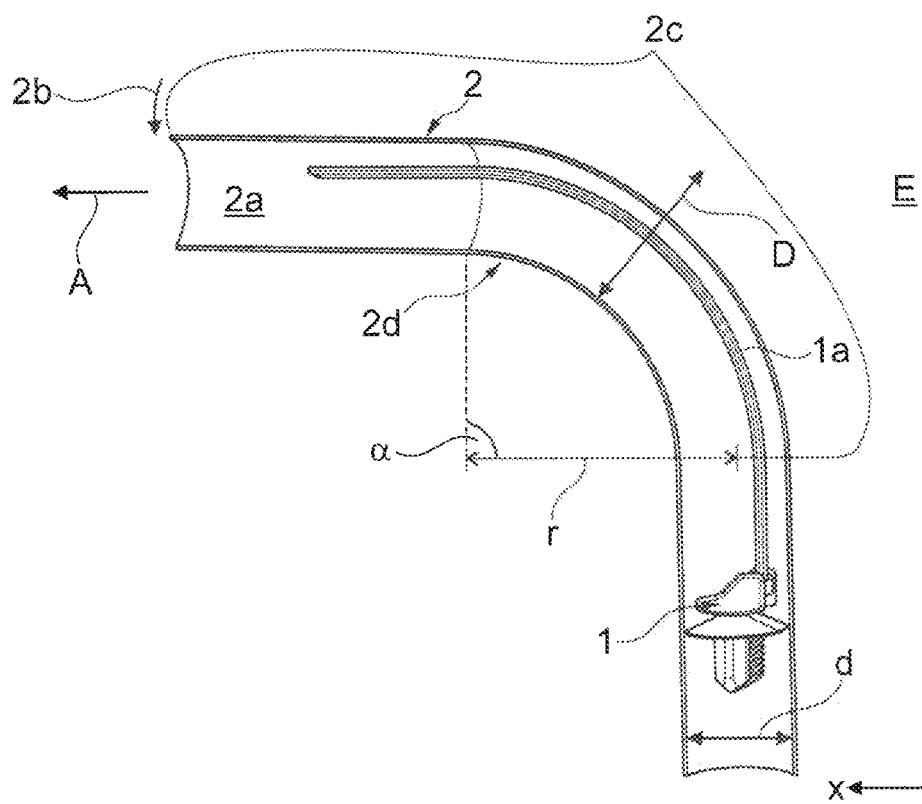
FIG. 2 is a sectional view through a constructively predetermined bend of an example hose unit with the one-piece tie of FIG. 1.

FIG. 2 shows a sectional view through a section of an example hose unit with a bend. The hose unit 2 is designed to guide the one-piece tie 1 in a hose inner 2*a* by means of an air flow along the hose unit 2 toward an outlet end 2*b* of the hose unit 2 and then out of the outlet end 2*b* of the hose unit 2 in an outlet direction A, which in this case coincides with a positive x-direction. In this case, the hose unit 2 has the constructively predetermined bend 2*d* in an end region 2*c* comprising the outlet end 2*b*. The end region 2*c* extends along the hose unit 2 over at most three times a length of the one-piece tie 1, in this case approximately over the single length of the one-piece tie 1 and thus in the case shown over at most twice the length of the one-piece tie 1. A radius r of the constructively predetermined bend 2*d* is at least 20 mm. In the example shown, an angle α of the constructively predetermined bend is specified as 90 degrees. In principle, angles α between 45 and 135 degrees are possible.

The constructively predetermined bend 2*d* in the end region 2*c* of the hose unit 2 has the effect here that one-piece ties 1, which are transported by means of air pressure through the hose inner 2*a*, automatically rotate into one of two orientations, since the band 1*a* of the one-piece tie 1 is significantly more flexible in the thickness direction D than in the width direction B. Accordingly, as also shown in FIG. 2, the one-piece tie 1 is automatically rotated during transport through the bend 2*d* in such a way that the thickness direction D here lies in a bending plane E of the bend 2*d*, which coincides with the drawing or xy plane. Accordingly, the width direction B runs in the z direction perpendicular to the bending and xy plane. This orientation of the one-piece tie 1 is achieved independently of an initial or intermediate rotation of the one-piece tie 1 in a section of the hose unit 2 located before the bend 2*d*.

Figure 3:
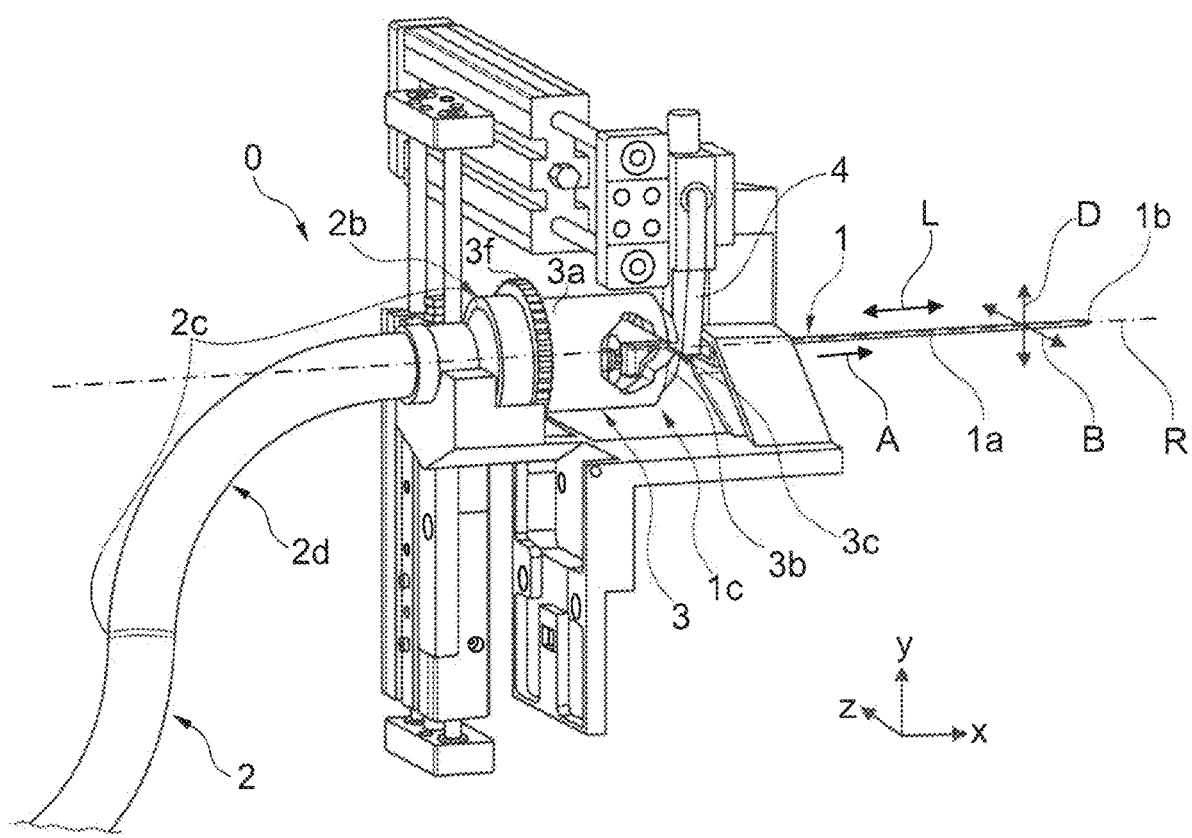
FIG. 3 is a perspective view of an example embodiment of a feeding device for the one-piece tie shown in FIG. 1.

FIG. 3 shows a perspective view of an example embodiment of a feeding device. The feeding device 0 has the hose unit 2, which is designed to guide the respective one-piece tie 1 in the hose inner 2*a* (FIGS. 2, 4) by means of the air flow along the hose unit 2 towards the outlet end 2*b* of the hose unit 2 and then in an outlet direction A out of the outlet end 2*b* of the hose unit 2 to a funnel unit 3. Accordingly, the funnel unit 3 of the feeding device 0 is arranged at the outlet end 2*b* of the hose unit 2 on the hose unit 2 and is designed to receive the respective one-piece tie 1 guided through the hose unit 2. In the end region 2*c* comprising the outlet end 2*b*, the hose unit 2 has the constructively predetermined bend 2*d*. This bend runs in the xy plane here.

The funnel unit 3 has a funnel element 3*a* which is arranged rotatably relative to the outlet end 2*b* of the hose unit 2 about an axis of rotation R running along the outlet direction A by means of a drive element 3*g* of the funnel unit 3, in this case designed as a rack drive element, and has a slit 3*c* at an end region 3*b* remote (e.g., distal) from the outlet end 2*b* of the hose unit 2 in the outlet direction A, which slit 3*c* is designed to receive the band 1*a* of the respective one-piece tie 1. The slit 3*c* is oriented transversely to the bending plane E, in this case transversely to the xy-plane and thus in the z-direction, when the one-piece tie 1 is loaded into or received by the funnel element 3 in the intended use. Accordingly, a main extension direction of the slit 3*c* runs along the z-direction. Therefore, the funnel unit 3 is configured to arrange the funnel element 3*a* in one of two orientations during the receiving of the one-piece tie 1, namely in the orientation shown and in an orientation rotated about the rotation axis R by 180 degrees relative to the orientation shown.

Figure 5:
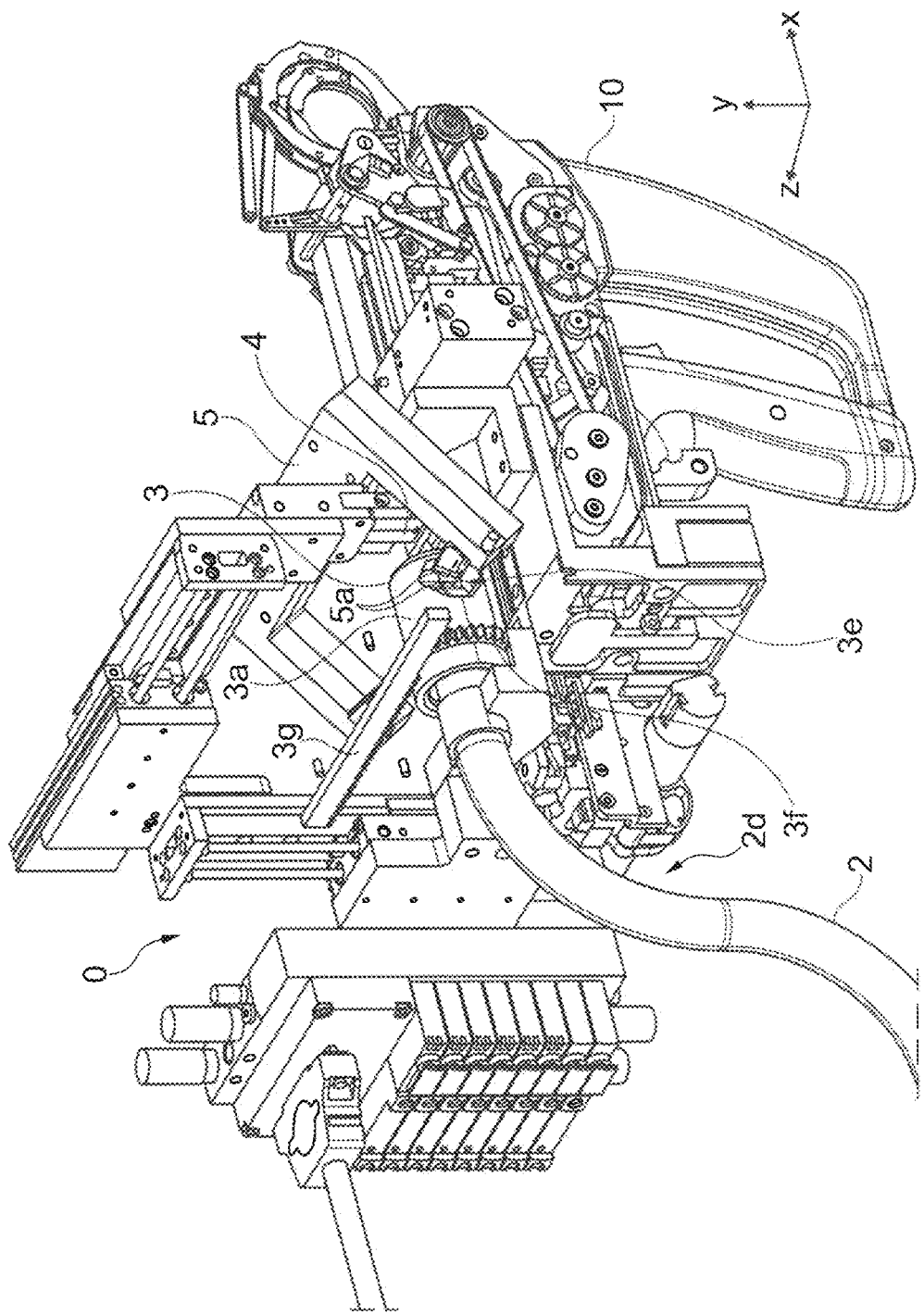
FIG. 5 is a perspective view of another example embodiment of a feeding device.

The embodiment shown also has a gripper unit 4, which is designed to grip the respective one-piece tie 1, whose band 1*c* is accommodated by the slit 3*c*, and to provide it to a tool to be equipped with the respective one-piece tie 1, for example a bundling tool 10 (FIG. 5).

Figure 4:
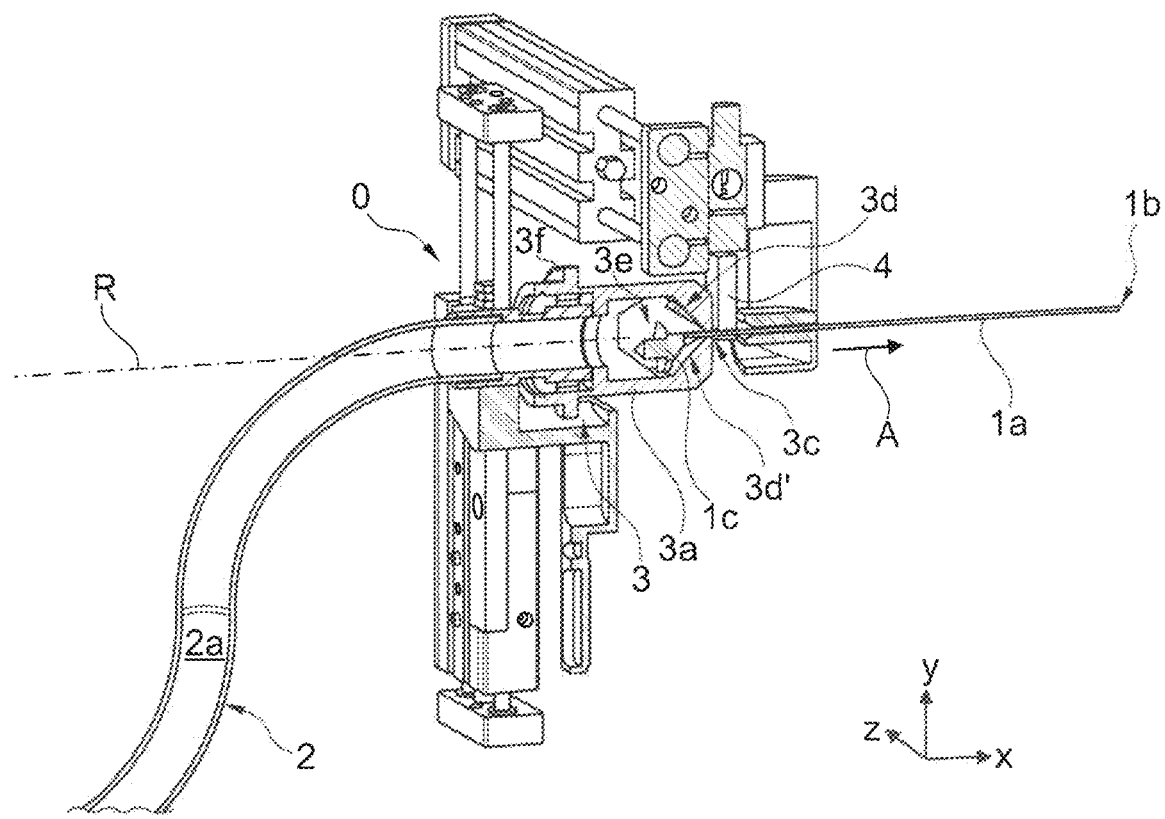
FIG. 4 is a sectional view through the feeding device of FIG. 3.

In FIG. 4, the feeding device of FIG. 3 is shown in a sectional view. Accordingly, only one, the rear opening 3*e* in the drawing plane is shown on the side of the funnel element 3*a* into which the slit 3*c* merges in the positive z-direction. Also shown are two funnel surfaces 3*d* and 3*d*' converging in the outlet direction A, the ends of which define the slit 3*c* and guide the band tip 1b or the band 1a of the one-piece tie 1 into the slit or gap 3c when the one-piece tie 1 is received in the funnel unit 3 in the intended use. In the example shown, the funnel walls 3d, 3d' are not designed as form-fit stop surfaces for the functional head 1c. As a result, there is a non-negligible cavity between the funnel wall 3d and the functional head 1c. The one-piece tie 1 can be bent into this hollow space when the functional head 1c hits the funnel wall, so that the position of the one-piece tie 1 in the funnel element 3a can change again due to restoring forces.

When the feeding device 0 is used as intended, loose one-piece ties 1 can be fed to the hose unit 2. Initially, e.g., before they are transported through the constructively predetermined bend 2d, these then have arbitrary orientations in the hose inner 2a in the sense of a stochastically distributed rotation about their respective longitudinal axis relative to the hose unit 2. When passing through the bend 2d, the single-piece ties 1 are automatically rotated about their respective longitudinal axis as explained above and reach the funnel unit 3 here with their thickness direction running in the xy-plane, thus in one of two orientations.

In the example shown, the functional head 1c is closer to the lower funnel surface 3d' than to the upper funnel surface 3d, where "upper" here denotes the positive y-direction. Alternatively, however, with the slit 3c arranged in the same way, the one-piece tie 1 could also be arranged in such a way that the functional head 1c would be closer to the upper funnel surface 3d than to the lower funnel surface 3d'. In intended use, the respective one-piece tie 1 is found with a predetermined probability in the lower orientation shown here or the upper orientation not shown. For example, the respective probabilities may be 50%. If, for example, the orientation of the one-piece tie 1 shown in FIG. 4 is now the orientation suitable for the gripper unit 4, then the funnel element 3a can be sensibly left in the position shown. If, on the other hand, the other of the two possible orientations, in which the functional head 1c is closer to the upper funnel surface 3d, were the orientation intended for the gripper unit 4, then a rotation of the funnel element 3a and thus of the one-piece tie 1 by 180 degrees could be initiated, so that in both cases the orientation intended for the gripper unit 4 is reliably achieved by simple means.

FIG. 5 shows a perspective view of a further example embodiment of a feeding device. The feeding device 0 is mechanically and here also electrically coupled to an automatic bundling tool 10 for bundling a bundle good by means of the respective one-piece tie 1, so that the one-piece ties 1 provided by the feeding device 0 can each be inserted with the gripping unit 4 into the bundling tool 10 and used there. In this respect, the feeding device 0 shown corresponds to the feeding device 0 shown in FIGS. 3 and 4 if not described otherwise.

In contrast to the feeding device 0 shown in FIGS. 3 and 4, the present variant has a sensor unit 5. The sensor unit 5 of the feeding device 0 here is designed to detect an orientation of the respective one-piece tie 1 when the band 1a of the respective one-piece tie is received in the slit 3c. In the example shown, this is done by a light barrier whose light beams 5a penetrate through the lateral openings 3e of the funnel element 3a and thus allow the orientation of the one-piece tie 1 to be checked. By detecting or checking the respective orientation by means of the sensor unit 5, the funnel element 3a can be rotated about the axis of rotation R by a control unit coupled to the sensor unit 5 and the funnel unit 3a in order to achieve a desired orientation of the one-piece tie 1 in the longitudinal direction L of the one-piece tie 1. This can be implemented, for example, with the drive element 3g designed as a rack drive element, which here cooperates with a further drive element 3f designed as toothed drive element. If, for example, the orientation of the one-piece tie 1 shown in FIG. 4 is now the orientation suitable for the gripper unit 4, the control unit will not orient the funnel element 3a differently, but will not move it and leave it in the position shown. If, on the other hand, the other of the two possible orientations, in which the functional head 1c is closer to the upper funnel surface 3d, were the orientation intended for the gripper unit 4, the control unit could automatically cause the funnel element 3a and thus the one-piece tie 1 to rotate by 180 degrees, so that in both cases the orientation intended for the gripper unit 4 is reliably achieved by simple means.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A feeding device for guiding and supplying one-piece ties comprising:
   a hose unit designed to guide a respective one-piece tie along the hose unit in a hose inner via an air flow toward an outlet end of the hose unit and subsequently in an outlet direction out of the outlet end of the hose unit to a funnel unit; and
   the funnel unit arranged at the outlet end of the hose unit and on the hose unit, the funnel unit designed to receive the respective one-piece tie guided through the hose unit,
   wherein the hose unit has a bend in an end region encompassing the outlet end, and
   wherein the funnel unit has a funnel element arranged rotatably about an axis of rotation running along the outlet direction via a drive element of the funnel unit relative to the outlet end of the hose unit, the funnel element includes a slit at the end region remote from the outlet end of the hose unit in the outlet direction, and the slit is formed to receive a band of the respective one-piece tie.

2. The feeding device according to claim 1, wherein the slit is oriented transversely to a bending plane in which the bend runs.

3. The feeding device according to claim 1, further comprising:
   a gripper unit adapted to grip and provide the respective one-piece tie with the band received by the slit.

4. The feeding device according to claim 3, wherein the gripper unit is adapted to grip and provide the respective one-piece tie to an automatic bundling tool for bundling a bundle good via the respective one-piece tie.

5. The feeding device according to claim 3, further comprising:

a sensor unit designed to detect an orientation of the respective one-piece tie when the band of the respective one-piece tie is accommodated in the slit; and a control unit coupled to the sensor unit and to the funnel unit, the control unit configured to, as a function of the orientation of the respective one-piece tie detected by the sensor unit, bring the funnel element into a predetermined rotational position.

6. The feeding device according to claim 5, wherein the predetermined rotational position orients the respective one-piece tie in an orientation suitable for the gripper unit.

7. The feeding device according to claim 6, wherein the funnel element is either rotated by 180 degrees via the drive element or not rotated in order to be brought into the predetermined rotational position.

8. The feeding device according to claim 5, wherein the detected orientation is one of two orientations.

9. The feeding device according to claim 1,
wherein the slit merges at one end into an opening oriented transversely to the outlet direction on a side of the funnel element, or
wherein the slit merges at both ends into the opening oriented transversely to the outlet direction on the side of the funnel element.

10. The feeding device according to claim 1,
wherein the end region with the bend extends along the hose unit over at most three times a length of the one-piece ties which are guided through the feeding device during intended use; or
wherein the end region with the bend extends along the hose unit over at most two times a length of the one-piece ties which are guided through the feeding device during intended use.

11. The feeding device according to claim 1, wherein a radius of the bend is at least 20 mm.

12. The feeding device according to claim 1, wherein an angle of the bend is at least 45 degrees.

13. The feeding device according claim 1, wherein the hose unit at the bend is at least partially made of a metal.

14. The feeding device according to claim 13, wherein the hose inner on an outer side of the bend is at least partially made of the metal.

15. The feeding device according to claim 1, wherein the hose inner has a round cross-section.

16. The feeding device according to claim 15, wherein a functional head of the one-piece ties, which are guided through the feeding device during intended use, has a round cross-section at a point of the largest diameter.

17. A system comprising:
an automatic bundling tool for bundling a bundle good with one-piece ties; and a feeding device for guiding and supplying the one-piece ties, the feeding device comprising:
a hose unit designed to guide a respective one-piece tie along the hose unit in a hose inner via an air flow toward an outlet end of the hose unit and subsequently in an outlet direction out of the outlet end of the hose unit to a funnel unit; and
the funnel unit arranged at the outlet end of the hose unit and on the hose unit, the funnel unit designed to receive the respective one-piece tie guided through the hose unit,
wherein the hose unit has a bend in an end region encompassing the outlet end, and
wherein the funnel unit has a funnel element arranged rotatably about an axis of rotation running along the outlet direction via a drive element of the funnel unit relative to the outlet end of the hose unit, the funnel element has a slit at the end region remote from the outlet end of the hose unit in the outlet direction, and the slit formed to receive a band of the respective one-piece tie.

18. The system of claim 17, wherein the automatic bundling tool is coupled to the feeding device.

19. The system of claim 17, wherein the automatic bundling tool comprises at least one of a mechanical or electrical interface for coupling to the feeding device.

20. A method for guiding and providing one-piece ties comprising:
guiding a respective one-piece tie along a hose unit in a hose inner of the hose unit towards an outlet end of the hose unit via an air flow;
guiding the respective one-piece tie through an end portion of the hose unit that has a bend;
guiding the respective one-piece tie in an outlet direction out of the outlet end of the hose unit to a funnel unit;
receiving the respective one-piece tie by the funnel unit, wherein a band of the respective one-piece tie is received by a slit in a funnel element of the funnel unit;
checking an orientation of the respective one-piece tie received by the slit to determine if the orientation is a first orientation or a second orientation;
responsive to determining the first orientation, providing the respective one-piece tie in the first orientation; and
responsive to determining the second orientation:
rotating the respective one-piece tie received by the slit about an axis of rotation extending along the outlet direction from the second orientation to the first orientation; and
providing the respective one-piece tie in the first orientation.

* * * * *